(12) United States Patent
Jackson

(10) Patent No.: US 10,215,303 B2
(45) Date of Patent: Feb. 26, 2019

(54) ADJUSTABLE TRAVEL STOP FOR A PISTON ACTUATOR

(71) Applicant: FISHER CONTROLS INTERNATIONAL LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 410 days.

(21) Appl. No.: 14/715,968

(22) Filed: May 19, 2015

(65) Prior Publication Data

US 2016/0319849 A1 Nov. 3, 2016

Related U.S. Application Data

(60) Provisional application No. 62/155,851, filed on May 1, 2015.

(51) Int. Cl.
| | |
|---|---|
| *F15B 15/24* | (2006.01) |
| *F15B 15/14* | (2006.01) |
| *F16K 31/163* | (2006.01) |
| *F16K 31/122* | (2006.01) |

(52) U.S. Cl.
CPC .......... *F16K 31/1635* (2013.01); *F15B 15/24* (2013.01); *F16K 31/122* (2013.01)

(58) Field of Classification Search
CPC ... F16K 31/1635; F15B 15/02; F15B 15/1438
USPC ...................................................... 92/15, 136
See application file for complete search history.

(56) References Cited

U.S. PATENT DOCUMENTS

| | | | |
|---|---|---|---|
| 2,326,686 A | 8/1943 | Rutledge | |
| 3,737,142 A * | 6/1973 | Boswell .................. | F15B 21/02 251/58 |
| 3,958,592 A * | 5/1976 | Wells ..................... | F16K 3/0254 137/237 |
| 3,983,757 A | 10/1976 | Nelimarkka | |
| 4,489,756 A * | 12/1984 | Balz ....................... | F16K 3/0263 137/625.33 |
| 4,852,773 A * | 8/1989 | Standlick ................ | B05B 1/306 222/504 |
| 5,462,030 A * | 10/1995 | Shinogle ............ | F02M 37/0023 123/300 |

(Continued)

OTHER PUBLICATIONS

International Search Report and Written Opinion for PCT/US2016/030371 dated Aug. 17, 2016.

(Continued)

*Primary Examiner* — Nathaniel E Wiehe
*Assistant Examiner* — Richard Drake
(74) *Attorney, Agent, or Firm* — Marshall, Gerstein & Borun LLP

(57) ABSTRACT

A piston actuator includes a transfer assembly and an actuator assembly connected to the transfer assembly. The actuator assembly has a cylinder assembly with a side wall and an end wall and defines a cavity. A piston assembly is disposed within the cavity and a screw guide assembly is secured to the end wall of the cylinder assembly such that the screw guide assembly is adjustable to limit the travel of the piston assembly.

8 Claims, 5 Drawing Sheets

(56) References Cited

U.S. PATENT DOCUMENTS

| | | | | |
|---|---|---|---|---|
| 5,765,595 | A * | 6/1998 | Ballun | F04D 9/006 137/202 |
| 6,640,688 | B1 * | 11/2003 | Harper | F15B 15/066 92/129 |
| 6,666,129 | B1 * | 12/2003 | Schmid | F15B 15/068 92/13.6 |
| 6,969,042 | B2 * | 11/2005 | Gaydos | E21B 33/062 251/1.1 |
| 7,861,741 | B2 * | 1/2011 | Kress | E02F 9/2221 137/556.3 |
| 8,282,070 | B2 * | 10/2012 | Davies, Jr. | F16K 31/1262 251/14 |
| 2017/0307094 | A1 * | 10/2017 | Choate | F16K 17/06 |

OTHER PUBLICATIONS

Fisher 1061 Pneumatic Piston Rotary Actuator with Style F&G Mounting Adaptations Instruction Manual dated Oct. 2012, 28 pgs.
Fisher 1061 Pneumatic Piston Rotary Actuator with Style H&J Mounting Adaptations dated Oct. 2012, 24 pgs.
Fisher 1061 Pneumatic Piston Rotary Actuator Product Bulletin dated Feb. 2013, 8 pgs.
Fisher 585C Series Piston Actuators Instruction Manual dated Oct. 2013, 36 pgs.
Fisher 585C Piston Actuators Product Bulletin dated Sep. 2014, 16 pgs.

\* cited by examiner

ADJUSTABLE TRAVEL STOP FOR A PISTON ACTUATOR

CROSS-REFERENCE TO RELATED APPLICATIONS

This application claims priority to U.S. Provisional Patent Application No. 62/155,851, entitled "Adjustable Travel Stop for a Piston Actuator" and filed on May 1, 2015, the entire disclosure of which is hereby incorporated by reference herein.

FIELD OF THE DISCLOSURE

This disclosure relates generally to piston actuators and, more particularly, to adjustable travels stops for piston actuators.

BACKGROUND

Fluid control valves are commonly distributed throughout process control systems to control flow rates and/or pressures of various fluids (e.g. liquids, gases, etc.). A fluid control valve is typically operatively connected to an actuator assembly to displace a valve stem to operate the fluid control valve. Typically, movement of the actuator moves the valve stem to position a plug or flow control member within the valve. In the case of a piston actuator, a pressure differential across a piston of the actuator displaces the piston, which in turn moves or rotates the valve stem to operate the valve. For example, the Fisher® 1061 pneumatic piston rotary actuator can be used to operate splined-shaft rotary control valves such as the Vee-Ball™ valves, eccentric disc valves, and butterfly valves. The actuator/valve body linkage of this actuator can be positioned for either push-down-to-open or push-down-to-close action.

In certain circumstances, it may be desirable to limit the travel of the piston within the actuator, which in turn will limit the movement of the valve. However, in typical piston actuators, this travel of the piston is limited using fixed travel stops within the cylinder of the actuator. Therefore, there is no way to adjust the travel limit of the piston without removing the cylinder of the piston actuator and either replacing the cylinder of piston actuator with a different cylinder having a different sized fixed travel stop or removing the currently installed fixed travel stops and replacing them with different sized fixed travel stops. Therefore, it would be desirable to have a piston actuator that had a travel stop that could be adjusted to various travel distances for the piston without having to disassembly the piston actuator.

BRIEF SUMMARY OF THE DISCLOSURE

In accordance with one exemplary aspect of the present invention, a piston actuator comprises a transfer assembly and an actuator assembly connected to the transfer assembly, the actuator assembly comprises a cylinder assembly comprising a cylinder having a side wall and an end wall and defining a cavity. A piston assembly is disposed within the cavity of the cylinder assembly and a screw guide assembly is secured to the end wall of the cylinder assembly such that the screw guide assembly is adjustable to limit the travel of the piston assembly.

In further accordance with any one or more of the foregoing exemplary aspects of the present invention, a piston actuator may further include, in any combination, any one or more of the following preferred forms.

In one preferred from, the transfer assembly is a rotary transfer assembly that converts a linear movement of the actuator assembly into rotational movement of a rotational valve.

In another preferred form, the transfer assembly is a yoke that interconnects the actuator assembly and a linear valve.

In another preferred form, the screw guide assembly comprises a screw guide and a travel stop. The screw guide is inserted through an aperture in the end wall of the cylinder and secured to the cylinder and comprises a threaded bore extending longitudinally through the screw guide. The travel stop has a threaded external surface and is threaded into the threaded bore of the screw guide.

In another preferred form, the screw guide comprises a threaded external surface and the screw guide assembly further comprises a nut threaded onto the threaded external surface to secure the screw guide to the cylinder.

In another preferred form, the screw guide comprises a flange positioned within the cylinder and engaging an end wall of the cylinder and an O-ring is positioned between the flange of the screw guide and the cylinder to provide a fluid tight seal between the screw guide and the cylinder.

In another preferred form, the screw guide assembly further comprises a jam nut threaded onto the threaded external surface of the travel stop to prevent movement of the travel stop.

In another preferred form, the travel stop comprises a first end and a second end. The second end is configured to engage the piston assembly at a maximum travel of the piston assembly and the first end is configured to receive a tool to rotate the travel stop.

In accordance with another exemplary aspect of the present invention, an actuator assembly for a piston actuator comprises a cylinder assembly comprising a cylinder having a side wall and an end wall and defining a cavity. A piston assembly is disposed within the cavity of the cylinder assembly and a screw guide assembly secured to the end wall of the cylinder assembly such that the screw guide assembly is adjustable to limit the travel of the piston assembly.

In accordance with another exemplary aspect of the present invention, an adjustable screw guide assembly for a piston actuator comprises a screw guide and a travel stop. The screw guide is adapted to be inserted through and secured to a cylinder of the piston actuator and comprises a threaded bore extending longitudinally through the screw guide. The travel stop has a threaded external surface and is threaded into the threaded bore of the screw guide.

In further accordance with any one or more of the foregoing exemplary aspects of the present invention, an actuator assembly or adjustable screw guide assembly may further include, in any combination, any one or more of the following preferred forms.

In one preferred from, the screw guide assembly comprises a screw guide and a travel stop. The screw guide is inserted through an aperture in the end wall of the cylinder and secured to the cylinder and has a threaded bore extending longitudinally through the screw guide. The travel stop has a threaded external surface and is threaded into the threaded bore of the screw guide.

In another preferred form, the screw guide comprises a threaded external surface and the screw guide assembly further comprises a nut threaded onto the threaded external surface to secure the screw guide to the cylinder.

In another preferred form, the screw guide comprises a flange positioned within the cylinder and engaging an end wall of the cylinder and an O-ring is positioned between the flange of the screw guide and the cylinder to provide a fluid tight seal between the screw guide and the cylinder.

In another preferred form, the screw guide assembly further comprises a jam nut threaded onto the threaded external surface of the travel stop to prevent movement of the travel stop.

In another preferred form, the travel stop comprises a first end and a second end. The second end is configured to engage the piston assembly at a maximum travel of the piston assembly and the first end is configured to receive a tool to rotate the travel stop.

In accordance with another exemplary aspect of the present invention, a method for adjusting the travel of a piston in a piston actuator, comprising the steps of: inserting a screw guide through an aperture in a cylinder of the piston actuator; securing the screw guide to the cylinder; threading a travel stop into a threaded bore of the screw guide; rotating the travel stop to set a limit of travel for the piston; and securing the position of the travel stop.

DETAILED DESCRIPTION

In the examples shown herein, the piston actuator has an adjustable travel stop that eliminates a possible concern of over loading the travel stop threads. The load encountered by the travel stop when contacted by the piston is distributed through the cylinder by a screw guide positioned in the top of the cylinder and made of steel or other material that has a greater strength and/or hardness that the material of the cylinder. This allows a higher strength material to be used for the threaded connection and increases the thread engagement of the travel stop. Alternatively, the travel stop could be threaded into a threaded aperture formed in the top of the cylinder, however, this would require the entire cylinder to be made of a higher strength material to eliminate the concern of over loading the threaded when the travel stop contacts the piston.

Figure 1:
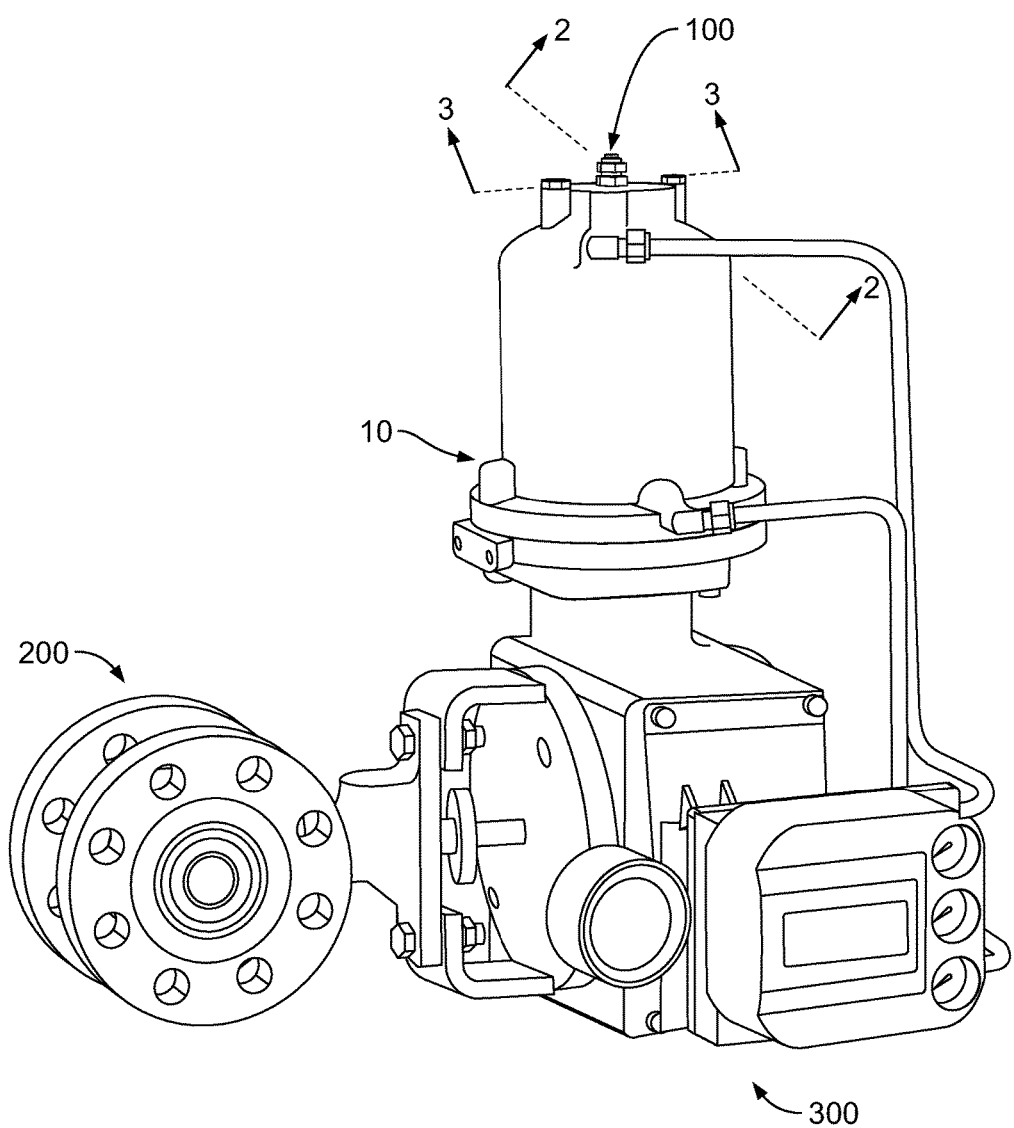
FIG. 1 is a perspective view of an example piston actuator with a valve and a controller.

Referring to FIG. 1, on example of a piston actuator 10, such as the Fisher® 1061 pneumatic piston actuator, is shown having an example adjustable screw guide assembly 100. Piston actuator 10 is also shown operatively connected to a valve 200, such as the Fisher® V500, and a controller 300, such as the Fisher® DVC6200 FIELDVIEW™ Digital Valve Controller.

Figure 2:
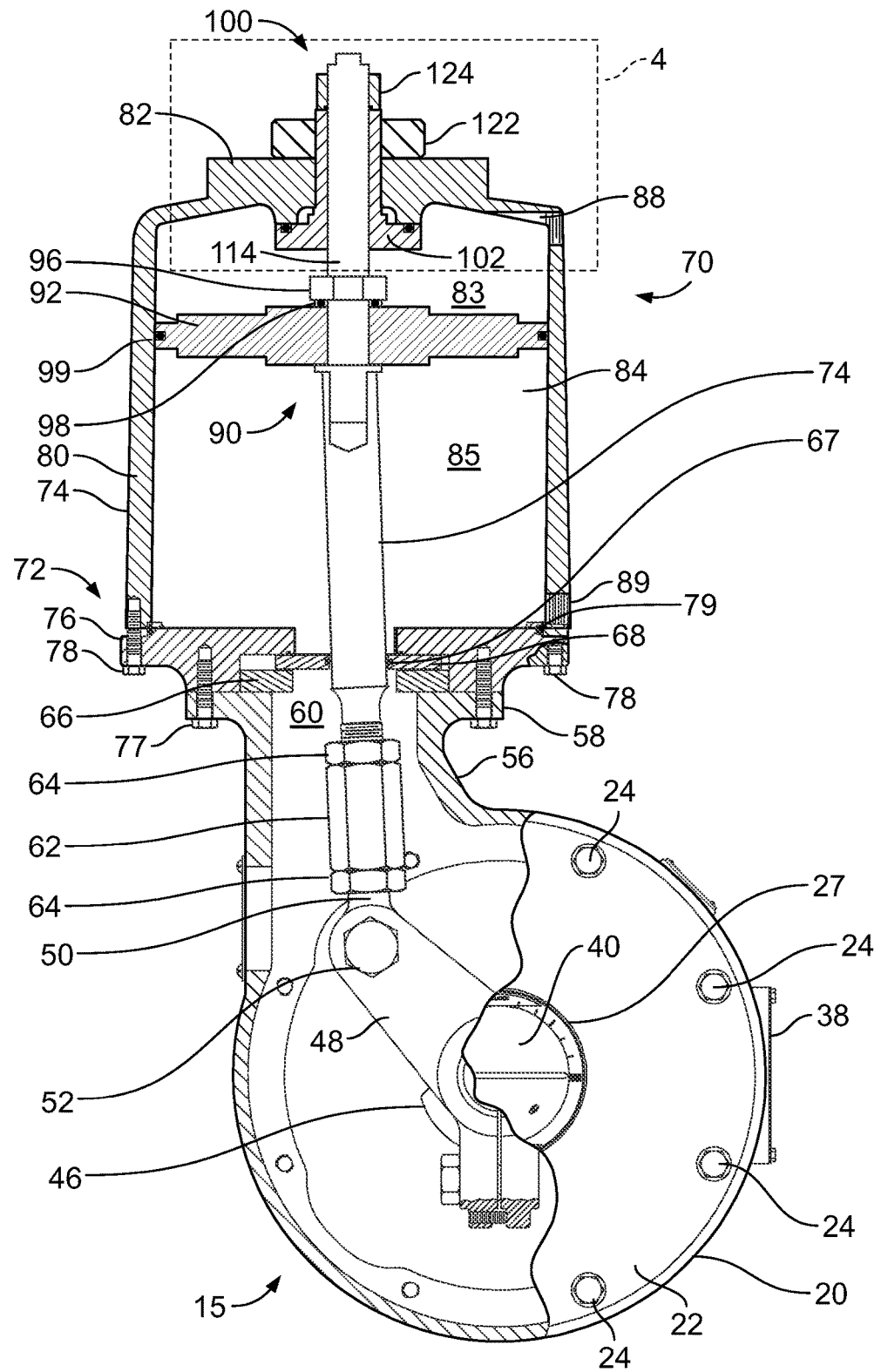
FIG. 2 is a partial side cross-sectional view of the piston actuator of FIG. 1 taken along line 2-2 in FIG. 1.
Figure 3:
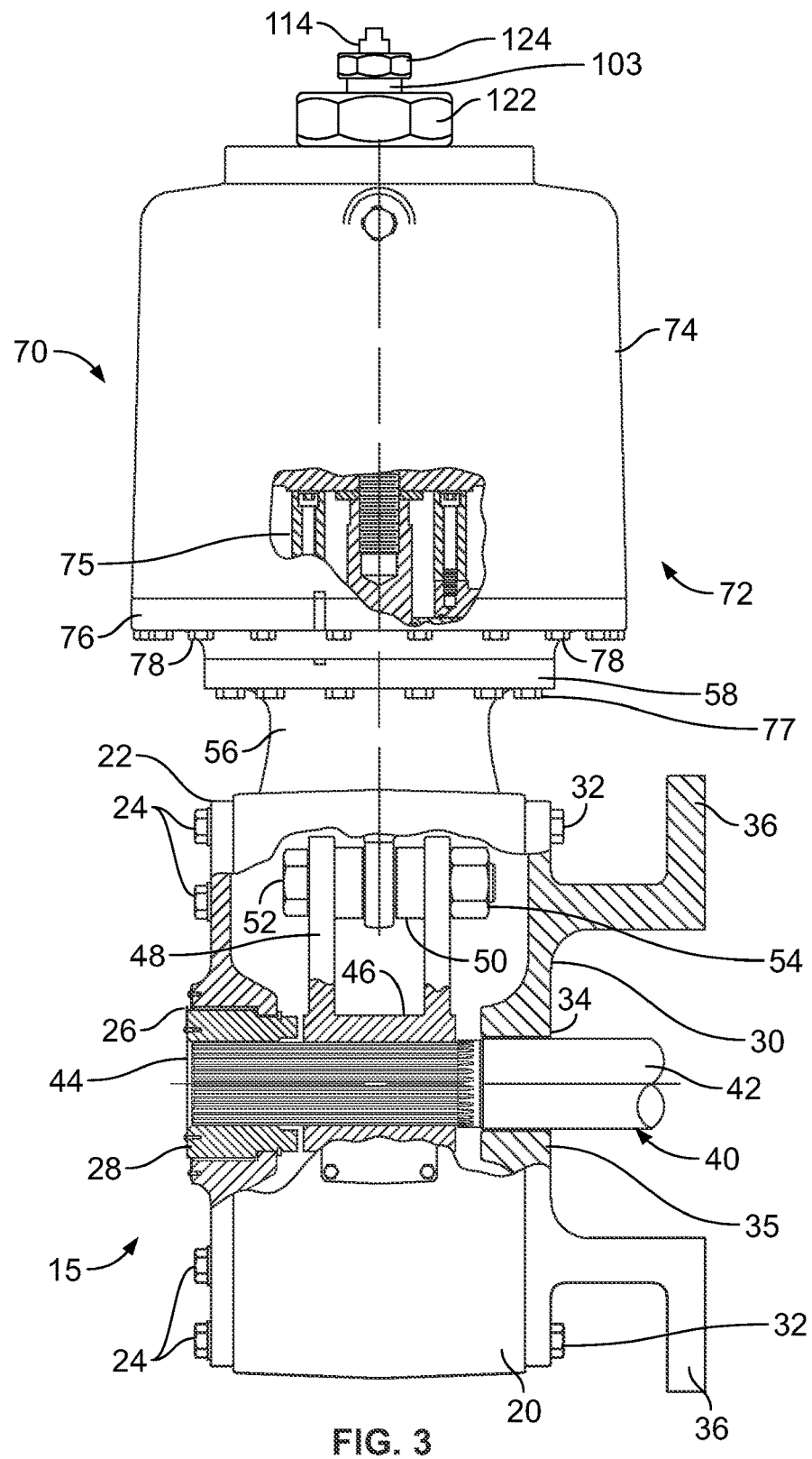
FIG. 3 is a partial side cross-sectional view of the piston actuator of FIG. 1 taken along line 3-3 in FIG. 1.
Figure 4:
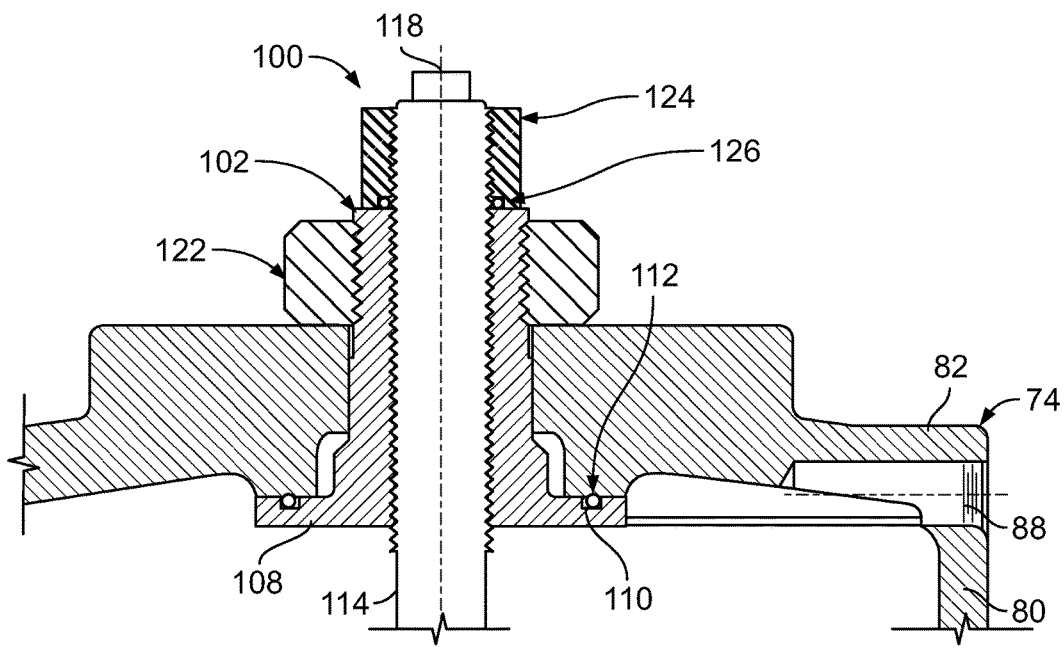
FIG. 4 is an enlarged view of a portion of the piston actuator of FIG. 2.

Referring to FIGS. 2 and 3, piston actuator 10 has a transfer assembly 15 and an actuator assembly 70. In the example shown, transfer assembly 15 is a rotary transfer assembly that converts a linear movement of actuator assembly 70 into rotational movement of a rotational valve 200. Alternatively, when used with a linear valve, transfer assembly 15 could be a yoke that interconnects actuator assembly 70 with a linear valve, which is well known to those skilled in the art. In this example, transfer assembly 15 has generally cylindrical housing 20 that is closed off on one end with cover 22 and on the opposite end with mounting yoke 30. Cover 22 is secured to housing 20 with cap screws 24 and has aperture 26 that receives hub 28, which receives and supports stem 40. A travel indicator 27 can also be located on an exterior of cover 22 to track and provide an indication of the position of stem 40, and thus the estimated position or travel of valve 200.

Mounting yoke 30 is secured to housing 20 with cap screws 32 and also has an aperture 34 to allow stem 40 to pass through and be connected to valve 200. Bushing 35 is positioned within aperture 34 to support stem 40 and allow stem 40 to rotate. Mounting yoke 30 also has one or more mounting arms 36 from an exterior surface and can be used for mounting valve 200 to piston actuator 10. Similarly, controller 300 can be mounted to piston actuator 10 through positioner plate 38 on housing 20.

Stem 40 is cylindrical and has a first portion 42 that is smooth and extends through aperture 34 in mounting yoke 30 and a second portion 44 that is ridged an is secured in hub 28 in aperture 26 of cover 22. Lever 46 is secured to second portion 44 of stem 40 and has lever arm 48 that extends away from stem 40 such that lever arm 48 moves as stem 40 rotates. Rod end bearing 50 is rotatably connected to a distal end of lever arm 48 with cap screw 52 and nut 54.

Housing 20 also has a wall 56 extending from a side of housing 20 and flange 58 extending from a distal end of wall 56, which is used to secure housing 20 to actuator assembly 70. Wall 56 also forms opening 60, which allows piston rod ## to pass from actuator assembly 70 into housing 20 and connect to rod end bearing 50 via turnbuckle 62 and hex nuts 64.

Actuator assembly 70 generally includes cylinder assembly 72, piston assembly 90, and adjustable screw guide assembly 100. Cylinder assembly 72 includes cylinder 74 and cylinder flange 76 secured to cylinder 74 with cap screws 78 to form cavity 84. An O-ring 79 can also be positioned between cylinder 74 and cylinder flange 76 to provide a fluid tight seal and a fixed bottom travel stop 75 (FIG. 3) and be formed by or secured to cylinder flange 76 to limit the downward travel of piston assembly 90. Actuator assembly 70 is secured to housing 20 with cap screws 77 that extend through holes in flange 58 and thread into cylinder flange 76. Thrust washer 66 and sliding seal 68 can also be positioned between wall 56 and cylinder flange 76 to provide a fluid tight seal between wall 56 and cylinder flange 76. An O-ring 67 can also be positioned between sliding seal 68 and cylinder flange 76. Sliding seal 68 receives and provides a fluid tight seal with piston rod 94 and is movable radially to radial movement of piston rod 94.

Figure 5:
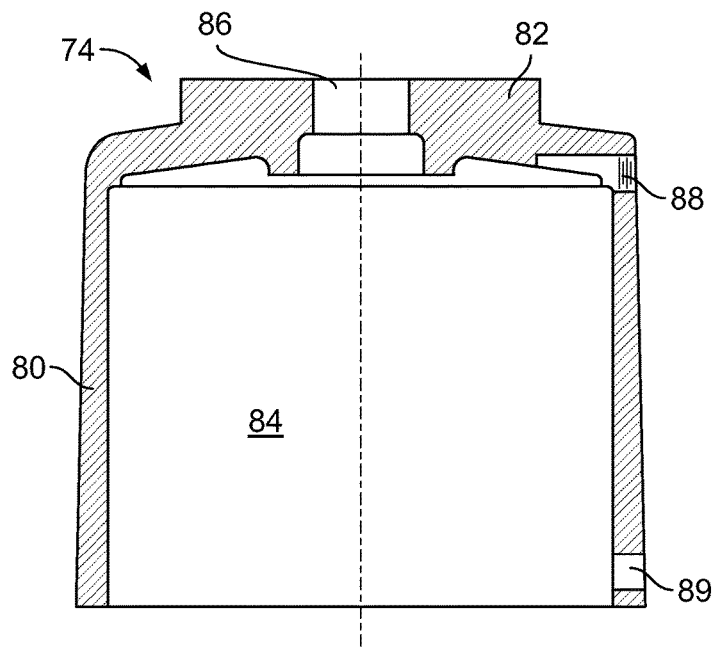
FIG. 5 is a side cross-sectional view of a cylinder of the piston actuator of FIG. 2.

As best seen in FIG. 5, cylinder 74 has a generally cylindrical side wall 80 and an end wall 82. Aperture 86 is formed in end wall 82 and is configured to receive adjustable screw guide assembly 100, as discussed in more detail below. First fluid inlet 88 is formed in side wall 80 proximate end wall 82 and second fluid inlet 89 is formed in side wall 80 at an opposite end of side wall 80 to allow a fluid, such as compressed air, to be supplied into cavity 84 to move piston assembly 90.

Piston assembly 90 includes piston 92 and piston rod 94, which is attached to piston 92 with cap screw 96. O-ring 98 can be positioned between piston 92 and the head of cap screw 96 to provide a fluid tight seal. Piston 92 is extends across cavity 84 such that the edges of piston 92 are adjacent side wall 80 of cylinder 74, which divides cavity 84 into a first portion 83 and a second portion 85. O-ring 99 can also be placed in a groove formed in the edge of piston 92 to provide a fluid tight seal between piston 92 and side wall 80. A first end of piston rod 94 is adjacent piston 92 and has a threaded aperture to receive cap screw 96. A second end of piston rod 94, opposite the first end, extends through sliding seal 68 and has a threaded portion to operatively connect piston rod 94 to lever 46 through turnbuckle 62 and hex nuts 64.

Referring to FIGS. 2, 4, and 6-8, adjustable screw guide assembly 100 generally includes screw guide 102, travel stop 114, nut 122, and jam nut 124. Screw guide 102 is generally cylindrical and is positioned in aperture 86 of end wall 82. A threaded external surface 104 receives nut 122, a threaded bore 106 extends longitudinally through screw guide 102 to receive travel stop 114, and flange 108 at an end of screw guide 102 engages an inner surface of end wall 82 of cylinder 74. When assembled, flange 108 engages the inner surface of end wall 82 and nut 122 is threaded onto threaded external surface 104 of screw guide 102 to secure screw guide 102 to cylinder 74. Alternatively, rather than nut 122, screw guide 102 could be secured to cylinder 74 using a snap ring, clamp, or any other well-known method. O-ring 112 can also be positioned in groove 110 formed in flange 108 of screw guide 102 to provide a fluid tight seal between screw guide 102 and cylinder 74. Screw guide 102 is preferably made of steel, or another material that is harder that the material used for cylinder 74, so that the threads in threaded bore 106 can withstand the forces exerted on them when piston assembly 90 contacts travel stop 114.

Travel stop 114 is a generally cylindrical rod having an external surface 116 that is threaded to engage threaded bore 106 of screw guide 102. First end 118 of travel stop is adapted to engage a tool, which can be used to adjust travel stop 114 by rotating travel stop 114 within screw guide 102. For example, first end 118 could have a slot or other indentation to engage a regular or Philips head screw driver, a hex shaped indentation to engage an Allen wrench, a hex shaped outer surface to engage a wrench, etc. Alternatively, first end 118 could be shaped or have an extension or handle that allows travel stop 114 to be rotated and adjusted by hand. Second end 120 of travel stop is generally flat and is adapted to engage piston assembly 90 to limit the travel of piston assembly in the upward direction, using the orientation shown in FIG. 2. In the example shown, turning travel stop 114 clockwise moves travel stop 114 downward and shortens the upward travel of piston assembly 90, while turning travel stop 114 counter-clockwise moves travel stop 114 upwards and lengthens the travel of piston assembly 90.

Jam nut 124 can also be threaded onto external surface 116 of travel stop 114 until it abuts screw guide 102 to secure travel stop 114 and prevent movement of travel stop 114 due to engagement with piston assembly 90, once the location of travel stop 114 has been set. In addition, O-ring 126 can be positioned between jam nut 124 and screw guide 102 to provide a fluid tight seal between jam nut 124 and screw guide 102.

In operation, controller 300 can monitor the position of valve 200 and, based on a received signal or instruction, adjust the position of valve 200 by providing a fluid, such as compressed air, to first fluid inlet 88 or second fluid inlet 89 of actuator assembly 70. In the example shown, controller 300 can provide compressed air to first fluid inlet 88, or remove compressed air from second fluid inlet 89, until the fluid pressure in first portion 83 of cavity 84 is greater than the fluid pressure in second portion 85 of cavity 84. This pressure differential will move piston assembly 90 downward, using the orientation shown in FIG. 2, which in turn will rotate lever 46 and stem 40, which will move valve 200 towards an open position. Conversely, controller 300 can provide compressed air to second fluid inlet 89, or remove compressed air from first fluid inlet 88, until the fluid pressure in second portion 85 of cavity 84 is greater that the fluid pressure in first portion 83 of cavity 84. This pressure differential will move piston assembly 90 upward, which in turn will rotate lever 46 and stem 40, which will move valve 200 towards a closed position. Alternatively, depending on the design, moving piston assembly 90 upward could move valve 200 toward a closed position and moving piston assembly 90 downward could move valve 200 toward an open position.

Adjustable screw guide assembly 100 can also be used to limit the upward travel of piston assembly 90. Once the desired maximum upward travel of piston assembly 90 has been determined, travel stop 114 can be threaded into threaded bore 106 of screw guide 102. Rotation of travel stop 114 in one direction (e.g., clockwise) will extend travel stop 114 further into cavity 84, while rotation of travel stop in a the opposite direction (e.g., counter clockwise) will retract travel stop 114. Therefore, travel stop 114 can be rotated until second end 120 is located at the desired maximum upward travel of piston assembly 90. Jam nut 124 can then be threaded onto travel stop 114 until it engages screw guide 102 to fix the location of travel stop 114. As piston assembly 90 moves upward and reaches the desired upward travel, a portion of piston assembly 90, such as cap screw 96, will contact travel stop 114 and prevent piston assembly 90 from moving further upward. Depending on the particular application, travel stop 114 can be adjusted and moved to provide different travel lengths for piston assembly, without having to change out cylinder 74, which typically has a fixed upward travel stop. In addition, since screw guide 102 is made from a harder material than cylinder 74, it is less likely that the impact from piston assembly 90 contacting travel stop 114 will deform or otherwise damage the threads used to control the position of travel stop 114.

While various embodiments have been described above, this disclosure is not intended to be limited thereto. Variations can be made to the disclosed embodiments that are still within the scope of the appended claims.

What is claimed is:

1. A piston actuator, comprising:
    a transfer assembly; and
    an actuator assembly connected to the transfer assembly, the actuator assembly comprising:
        a cylinder assembly comprising a cylinder having a side wall and an end wall, the cylinder assembly defining a cavity;
        a piston assembly disposed within the cavity of the cylinder assembly; and
        a screw guide assembly secured to the end wall of the cylinder assembly; wherein
        the screw guide assembly is adjustable to limit a travel of the piston assembly; and
        the screw guide assembly comprises:
            a screw guide inserted through an aperture in the end wall of the cylinder and secured to the cylinder, the screw guide comprising a threaded bore extending longitudinally through the screw guide, a threaded external surface, and a flange positioned within the cylinder and engaging the end wall of the cylinder;

an O-ring positioned between the flange of the screw guide and the cylinder to provide a fluid tight seal between the screw guide and the cylinder;
a nut threaded onto the threaded external surface of the screw guide to secure the screw guide to the cylinder;
a travel stop comprising a solid cylindrical rod having a threaded external surface, the travel stop threaded into the threaded bore of the screw guide; and
a jam nut threaded onto the threaded external surface of the travel stop to secure the travel stop and prevent movement of the travel stop once a location of the travel stop has been set.

2. The piston actuator of claim 1, wherein the transfer assembly is a rotary transfer assembly that converts a linear movement of the actuator assembly into rotational movement of a rotational valve.

3. The piston actuator of claim 1, wherein the travel stop comprises:
a second end configured to engage the piston assembly at a maximum travel of the piston assembly; and
a first end configured to receive a tool to rotate the travel stop.

4. An actuator assembly for a piston actuator, the actuator assembly comprising:
a cylinder assembly comprising a cylinder having a side wall and an end wall, the cylinder assembly defining a cavity;
a piston assembly disposed within the cavity of the cylinder assembly; and
a screw guide assembly secured to the end wall of the cylinder assembly; wherein
the screw guide assembly is adjustable to limit the travel of the piston assembly; and
the screw guide assembly comprises:
a screw guide inserted through an aperture in the end wall of the cylinder and secured to the cylinder, the screw guide comprising a threaded bore extending longitudinally through the screw guide, a threaded external surface, and a flange positioned within the cylinder and engaging end wall of the cylinder;
an O-ring positioned between the flange of the screw guide and the cylinder to provide a fluid tight seal between the screw guide and the cylinder;
a nut threaded onto the threaded external surface to secure the screw guide to the cylinder;
a travel stop comprising a solid cylindrical rod having a threaded external surface, the travel stop threaded into the threaded bore of the screw guide; and
a jam nut threaded onto the threaded external surface of the travel stop to secure the travel stop and prevent movement of the travel stop once a location of the travel stop has been set.

5. The actuator assembly of claim 4, wherein the travel stop comprises:
a second end configured to engage the piston assembly at a maximum travel of the piston assembly; and
a first end configured to receive a tool to rotate the travel stop.

6. An adjustable screw guide assembly for a piston actuator, the screw guide assembly comprising:
a screw guide adapted to be inserted through and secured to a cylinder of the piston actuator, the screw guide comprising a threaded bore extending longitudinally through the screw guide, a threaded external surface, and a flange positioned within the cylinder of the piston actuator and engaging an end wall of the cylinder;
an O-ring positioned between the flange of the screw guide and the cylinder to provide a fluid tight seal between the screw guide and the cylinder;
a nut threaded onto the threaded external surface of the screw guide to secure the screw guide to the cylinder;
a travel stop comprising a solid cylindrical rod having a threaded external surface, the travel stop threaded into the threaded bore of the screw guide; and
a jam nut threaded onto the threaded external surface of the travel stop to secure the travel stop and prevent movement of the travel stop once a location of the travel stop has been set.

7. The adjustable screw guide assembly of claim 6, wherein the travel stop comprises:
a second end configured to engage a piston assembly of the piston actuator at a maximum travel of the piston assembly; and
a first end configured to receive a tool to rotate the travel stop.

8. A method for adjusting a limit of travel of a piston in a piston actuator, comprising the steps of:
inserting a screw guide through an aperture in a cylinder of the piston actuator such that a flange of the screw guide is positioned within the cylinder and engages an end wall of the cylinder;
positioning an O-ring between the flange of the screw guide and the cylinder to provide a fluid tight seal between the screw guide and the cylinder;
threading a nut onto a threaded external surface of the screw guide to secure the screw guide to the cylinder;
threading a travel stop into a threaded bore of the screw guide, the travel stop comprising a solid cylindrical rod;
rotating the travel stop to set the limit of travel for the piston; and
securing the travel stop by threading a jam nut onto an external threaded surface of the travel stop to prevent movement of the travel stop once the limit of travel for the piston has been set.

\* \* \* \* \*

UNITED STATES PATENT AND TRADEMARK OFFICE
CERTIFICATE OF CORRECTION

PATENT NO. : 10,215,303 B2  
APPLICATION NO. : 14/715968  
DATED : February 26, 2019  
INVENTOR(S) : Trenton Frank Jackson Page 1 of 1

It is certified that error appears in the above-identified patent and that said Letters Patent is hereby corrected as shown below:

In the Specification

At Column 1, Line 50, "disassembly" should be -- disassemble --.

At Column 2, Line 1, "from," should be -- form, --.

At Column 2, Line 54, "from," should be -- form, --.

Figure 6:
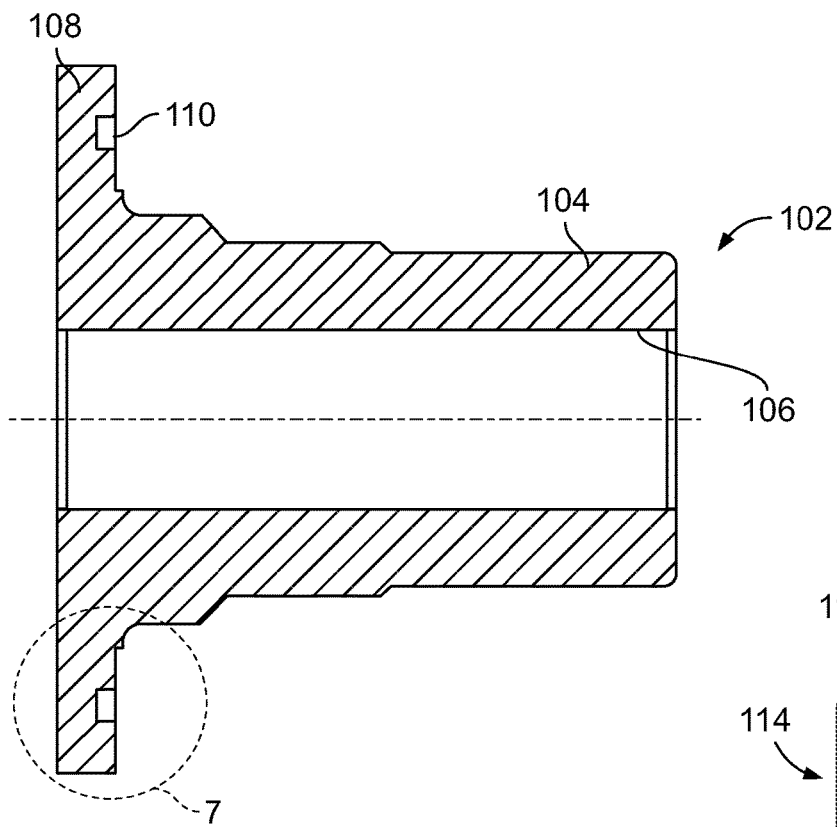
FIG. 6 is a side cross-sectional view of screw guide of the piston actuator of FIG. 2.
Figure 7:
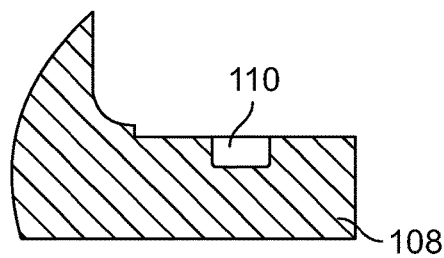
FIG. 7 is an enlarged view of a portion of the screw guide of FIG. 7.
Figure 8:
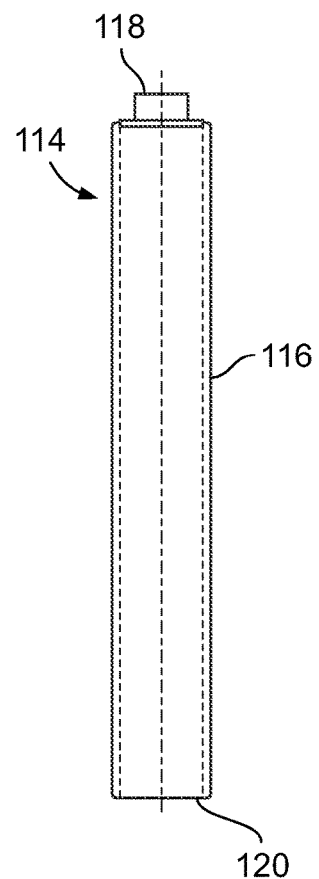
FIG. 8 is a side view of a travel stop of the piston actuator of FIG. 2.

At Column 3, Line 36, "FIG. 7" should be -- FIG. 6 --.

At Column 3, Line 48, "that the" should be -- than the --.

At Column 3, Line 57, "on example" should be -- one example --.

At Column 4, Lines 34-35, "piston rod ##" should be -- piston rod 94 --.

At Column 5, Line 1, "92 is extends" should be -- 92 extends --.

At Column 5, Lines 30-31, "harder that" should be -- harder than --.

At Column 6, Line 9, "that the" should be -- than the --.

At Column 6, Line 25, "in a the" should be -- in the --.

Signed and Sealed this  
Seventeenth Day of December, 2019

Andrei Iancu  
*Director of the United States Patent and Trademark Office*